Patented Oct. 20, 1925.

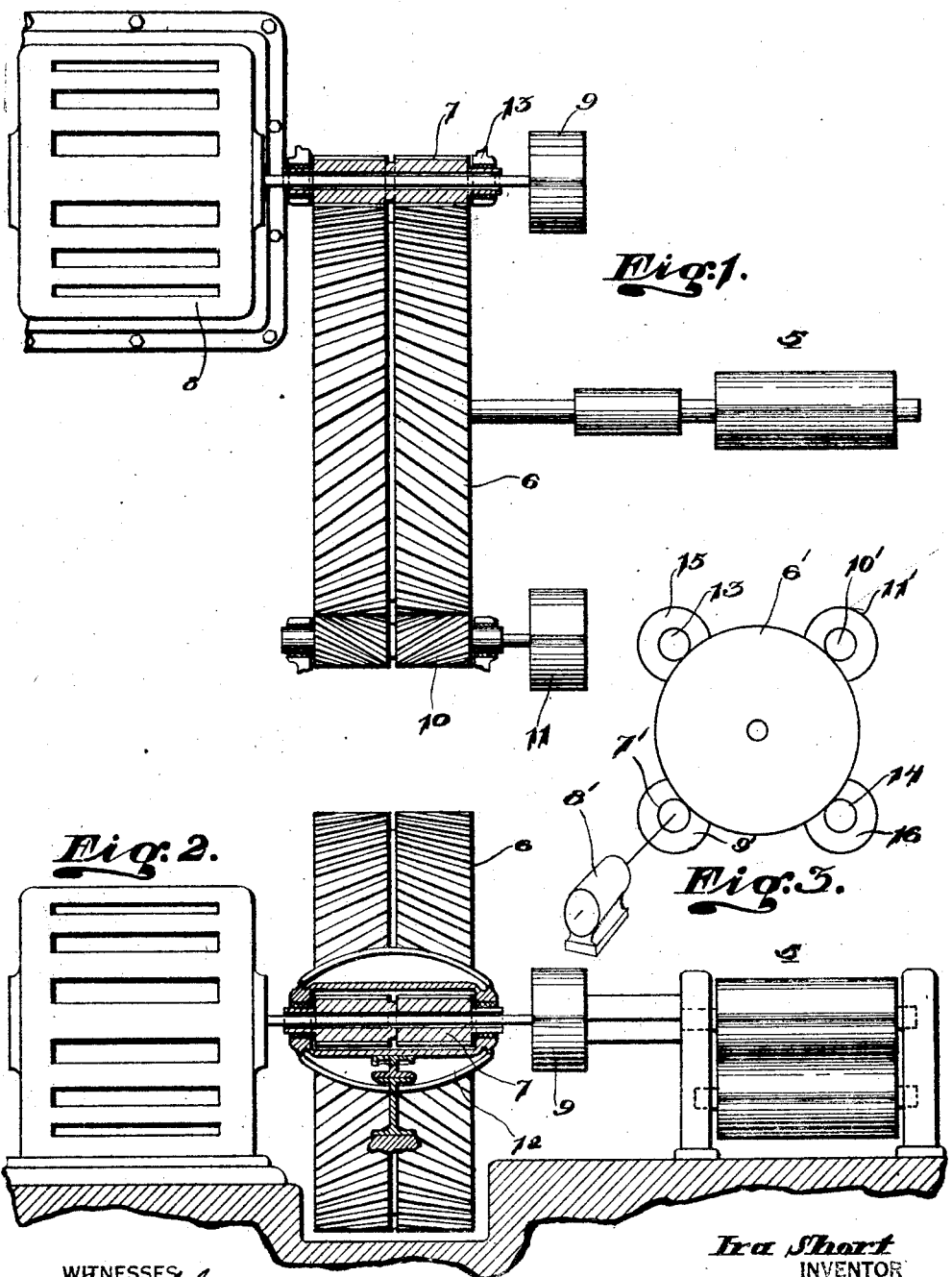

1,558,054

UNITED STATES PATENT OFFICE.

IRA SHORT, OF ESSINGTON, PENNSYLVANIA, ASSIGNOR, BY MESNE ASSIGNMENTS, TO WESTINGHOUSE GEAR AND DYNAMOMETER COMPANY, A CORPORATION OF PENNSYLVANIA.

GEAR DRIVE.

Application filed January 3, 1923. Serial No. 610,527.

*To all whom it may concern:*

Be it known that I, IRA SHORT, a citizen of the United States, and a resident of Essington, in the county of Delaware and State of Pennsylvania, have invented a new and useful Improvement in Gear Drives, of which the following is a specification.

My invention relates to a gear drive for loads of great magnitude which are subject to extreme variation and it has for its object to provide apparatus of the character designated which shall permit the operation of such loads from a power source of capacity insufficient to drive the load peaks directly, all without the imposition of severe strains on the component parts of the organization.

In the accompanying drawing, Fig. 1 is a plan view, partially in section, of apparatus embodying one form of my invention; Fig. 2 is a side view, partially in section, of the apparatus shown in Fig. 1 and Fig. 3 is a diagrammatic view of a modification of the apparatus shown in Figs. 1 and 2.

In the driving of steel mill rolls and in similar applications, a torque load is developed which is subject to extreme variation and it is desirable to drive this load from a prime mover of reasonable size and it has accordingly been proposed to associate a heavy flywheel with the prime mover in order to absorb energy therefrom when the torque load is low in value, and to supply said energy to the rolls at periods of high power demand.

When driving steel mill rolls from an electric motor, it has been customary to couple the motor to a pinion driving a relatively large gear, which, in turn, is coupled to the rolls and the flywheel has in general been coupled to the pinion in order to take advantage of the relatively high angular velocity thereof. It will be noted that with this arrangement, during periods of maximum power demand, the incoming energy from the prime mover and also from the flywheel, passes through only those teeth in contact, thus imposing severe strains on these teeth and necessitating an extremely heavy gear structure.

In accordance with the present invention, I associate one or more additional pinions with the main drive gear and I couple to each of said pinions an auxiliary flywheel or other momentum device, so that during periods of high power demand, energy is applied to the main gear wheel at a plurality of points, thus distributing the strain over a relatively large number of gear teeth and permitting the application of a lighter gear structure with more even distribution of the strains.

Referring to the drawing for a more detailed understanding of my invention, I show a pair of rolls, at 5, in Figs. 1 and 2, said rolls being such as are ordinarily employed in steel mills. These rolls are coupled by any suitable means to a main drive gear 6 which is shown as of the double-helical type, although plain gears may be used without departing from the spirit and scope of my invention.

A pinion 7 meshes with the gear 6 and in turn is coupled to a drive motor 8 and also to a relatively small flywheel 9.

An additional pinion 10 also meshes with the gear 6 and is further coupled to a flywheel 11.

The pinions 7 and 10 are shown as mounted in floating frames 12 and 13, respectively, in order to insure better tooth alignment, but these frames form no part of the present invention and are fully disclosed in United States Patent No. 946,455 issued January 11, 1910, to George W. Melville and John S. Macalpine.

In the operation of the apparatus thus described, the capacity of the motor 8 is far more than is necessary to drive the rolls 5 when idling, but when a steel billet encounters the rolls 5, the power absorption may rise temporarily to 12,000 H. P., whereas the capacity of the motor 8 would be, for example, 4,000 H. P. Accordingly, during periods of idling the motor 8 speeds up the mechanism and the flywheels 9 and 11 absorb a relatively large amount of energy. When a billet reaches the rolls, the gear 6 is radically reduced in speed, and energy is taken up from the flywheels 9 and 11, as well as from the motor 8. and it will be noted that this energy is applied to the gear 6 on opposite sides thereof so that it is transmitted through two separate groups of teeth and applied to the gear 6 in a symmetrical manner, permitting the installation of a lighter gear with safer metal stresses than would be the case were a single large flywheel employed as has been suggested hitherto.

Inasmuch as the teeth in the drive pinion 7 are subjected to the driving torque of the motor at all times, it may be advisable to use a relatively small flywheel at 9 or to even omit this element altogether, choosing such size and weight at the flywheel 11 as will impose substantially equal strains at the pinion 10 as arise at the pinion 7.

It will be obvious that the invention thus described may be carried out still further in that a greater number of pinions and auxiliary flywheels may be employed, in order to still further subdivide the total strains.

Thus, in Fig. 3, I show a gear 6' driven from a motor 8' through a pinion 7' having a flywheel 9', and not only do I employ the pinion 10' with its flywheel 11', but I may also employ two additional pinions 13 and 14 provided with flywheels 15 and 16, respectively, thus permitting the construction of a relatively light transmission device with extremely symmetrical distribution of the transmission strains.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. The combination with means providing a torque load subject to abrupt vibration, of means for driving said load including a gear, a plurality of pinions meshing with the gear, said pinions being spaced at substantially equal distances about the periphery of the gear, a plurality of freely rotatable inertia members driven by the respective pinions, and driving means connected to one of said pinions.

2. The combination with means providing a torque load subject to abrupt vibration, of means for driving said load embodying a gear, a plurality of pinions meshing with the gear, each of said pinions driving a fly wheel and one of said pinions driving the gear, said pinions being spaced at substantially equal distances about the periphery of the gear.

In testimony whereof, I have hereunto subscribed my name this 28th day of December, 1922.

IRA SHORT.